United States Patent [19]
Kurata et al.

[11] Patent Number: 4,558,374
[45] Date of Patent: Dec. 10, 1985

[54] PICTURE DATA PROCESSING DEVICE

[75] Inventors: Masami Kurata; Takashi Ohmori, both of Kanagawa, Japan

[73] Assignee: Fuji Xerox Co., Ltd., Tokyo, Japan

[21] Appl. No.: 493,481

[22] Filed: May 11, 1983

[30] Foreign Application Priority Data

May 14, 1982 [JP] Japan .................................. 57-79892

[51] Int. Cl.$^4$ ........................................... H04M 1/04
[52] U.S. Cl. .................................. 358/287; 358/257; 382/9; 382/16
[58] Field of Search .................. 358/257, 287, 256, 7; 382/9, 16

[56] References Cited

U.S. PATENT DOCUMENTS 4,009,954  3/1977  Ritzerfeld ............................. 355/7
4,303,332 12/1981  Sakai ..................................... 355/7
4,338,636  7/1982  Yamada et al. ...................... 358/256
4,371,848  2/1983  Nakamura ............................ 355/7
4,417,805 11/1983  Kishi .................................... 355/7

Primary Examiner—Edward L. Coles, Sr.
Attorney, Agent, or Firm—Sughrue, Mion, Zinn, Macpeak & Seas

[57] ABSTRACT

A picture data processing device in which a region specifying original having markings which physically define a region of interest of an original document to be processed is read and stored. When the original document is read, the stored markings are reproduced to mask out the areas of the original document other than the region of interest. A signal processing operation, such as extraction, rearrangement, or size alteration with respect to the selected region can then be performed.

6 Claims, 19 Drawing Figures

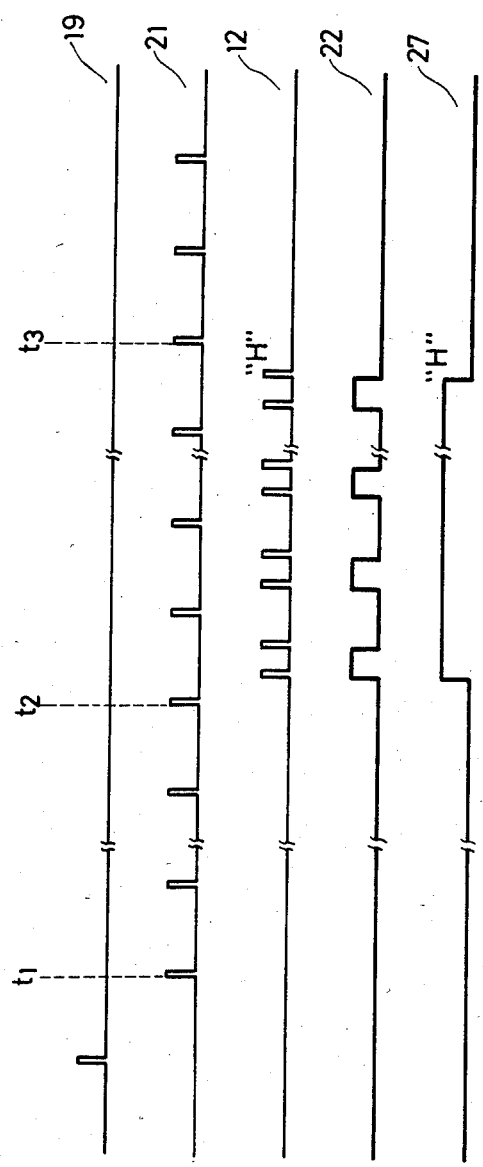

PICTURE DATA PROCESSING DEVICE

BACKGROUND OF THE INVENTION

This invention relates to a picture data processing device which extracts specified picture data from an original in order to rearrange, electrically transmit or record the picture data thus treated.

During the operation of a picture data processing device such as a facsimile device or a copying machine, it is often times required to electrically transmit or record only a portion of the original. For instance, with reference to FIG. 1, it is occasionally required to extract only a region E out of an original 1 and to record the region E thus extracted on a recording sheet 2 as shown in FIG. 2. Sometimes, it is required that, as shown in FIG. 3, particular regions A and E of an original 1 be rearranged and recorded. In addition, it is occasionally necessary to record the characters in a specified region of an original with a different magnification or in a different color. The frequency of such requirements increases as it becomes more necessary to process data in various manners with high accuracy.

A technique called a "mark skip system" is available for extraction of picture data as shown in FIG. 2. In the system, a mark is applied to a side end of an original or a document carrier such as a transparent sheet for conveying an original. These marks limit the auxiliary scanning region. Thus, the desired region of the original is surrounded by a mark so as to be identified such that only that region is electrically transmitted or recorded. If a mark is put on an original according to this system, the original cannot be used for any other purposes. In the case where no mark is put on the original, a special document carrier for position indication must be provided. With reference to FIG. 1, where a region is specified only in the auxiliary scanning direction, regions D and F also are extracted in the above-described case. This is, of course, undesirable. Accordingly, in practice, the following method is employed: The original is copied and only the necessary region is cut, to prepare a new original. Alternatively, the entire original is transmitted or recorded for extraction at the recording end.

No particular techniques have been provided for rearrangement, partical enlargement or contraction or coloring of picture data. Accordingly, heretofore, the following method has been employed: Enlarged, contracted or colored components of the original are prepared separately and are then bonded to the initial original to form a new original. The new original thus formed is transmitted or recorded.

As is apparent from the above description, in modifying the picture data in a region of an original, there has been no device which can effectively process the picture data, and an excessively large burden is given to the operator.

SUMMARY OF THE INVENTION

In view of the foregoing, an object of this invention is to provide a picture data processing device which can readily extract or rearrange the picture data of a region specified on an original.

In the device according to the invention, first a region specifying original is read so that the position of interest is stored, and then an original to be processed is read. According to the position thus stored, a signal processing operation such as an operation of extracting or rearranging the region is carried out.

BRIEF DESCRIPTION OF THE DRAWINGS

The structure and operation of the invention will become more apparent upon a detailed description of the preferred embodiment thereof. In the description to follow, reference will be made to the accompanying drawings, in which:

FIGS. 8a–e show various waveforms for a description of the circuit operation during auxiliary scanning position determination;

DETAILED DESCRIPTION OF THE PREFERRED EMBODIMENT

This invention will now be described in detail with reference to its preferred embodiment.

Figure 4:
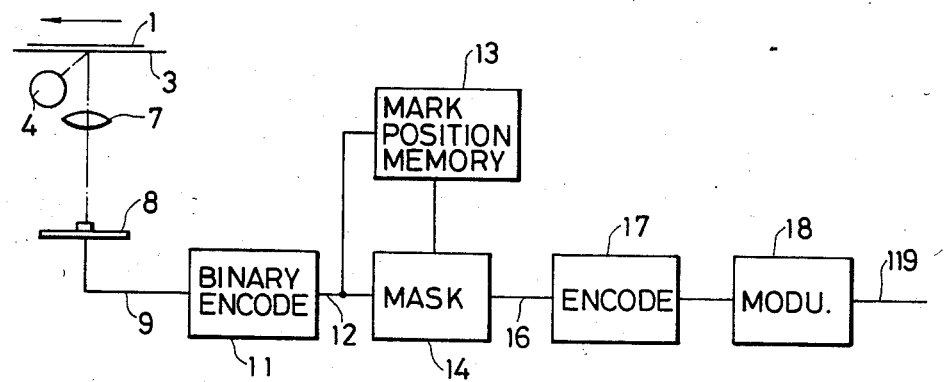
FIG. 4 is a block diagram showing a facsimile device according to the invention.

FIG. 4 shows the arrangement of a facsimile device which can extract a region out of a given original and transmit that data. A fluorescent lamp 4 is provided below a platen 3 in the device upon which an original 1 is mounted for illumination.

Figure 1:
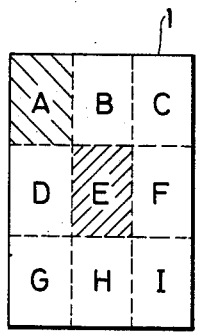
FIG. 1 is a plan view of an original for a description of a method of partially processing picture data.
Figure 2:
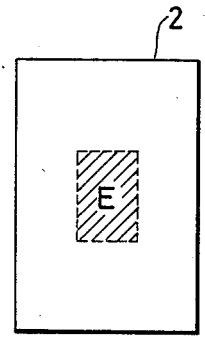
FIG. 2 is a plan view of a recording sheet on which a region of the original is recorded.
Figure 3:
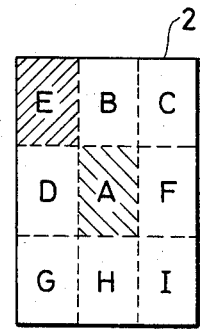
FIG. 3 is a plan view of a recording sheet on which regions of the original are recorded after being rearranged.
Figure 5:
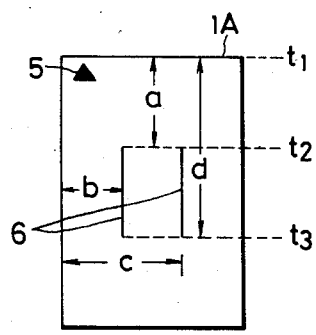
FIG. 5 is a plan view showing one example of a specifying original according to the invention.
Figure 6:
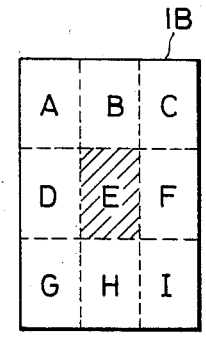
FIG. 6 is a plan view of a transmitting original.

The device uses two kinds of originals: a mark specifying original for specifying an extracting region, and a transmitting original for picture transmission. FIG. 5 shows the specifying original. The specifying original 1A is made of a thick semitransparent tracing paper, and is equal in size to the transmitting original 1B (FIG. 6). A direction indication mark 5 for positioning the specifying original 1A with respect to the platen 3 is printed in a drop-out color (which is not read) at a corner of the specifying original 1A. The specifying original 1A is placed on the transmitting original 1B, and under this condition the sides (in the auxiliary scanning direction) of a region E to be transmitted are marked (as indicated at 6) with suitable writing means so as to be physically defined by the markings.

Thereafter, only the specifying original 1A is placed on the platen 3. Under this condition, the operator depresses a transmitting region indicating button on an operating panel (not shown) of the facsimile device. As a result, the fluorescent lamp 4 is turned on, and the platen 3 is moved in the direction of the arrow so that the specifying original 1A is read. With reference to FIG. 5, light reflected from the specifying original 1A is applied through a lens 7 to an image sensor 8. The output analog signal of the image sensor 8 is applied to a binary-encoding circuit 11, where it is binary-encoded with a predetermined threshold level. The binary-encoded picture signal 12 is supplied to a mark position memory circuit 13, where the mark position is discriminated and stored. In this case, the following data are stored as shown in FIG. 5: (1) a distance a between the upper edge of the specifying original 1A and the upper end of each mark 6; (2) a distance b between the left edge of the specifying original 1A and the left mark 6; (3) a distance c between the left edge of the specifying original 1A and the right mark 6; and (4) a distance d between the upper edge of the specifying original 1A and the lower end of each mark 6. The discrimination and storage of the mark position signals will be described in detail later.

When the platen 3 is moved in a direction opposite to the direction of the arrow to the start position after the specifying original has been scanned, the operator places the transmitting original 1B in place of the specifying original 1A. Then, the facsimile device on the signal receiving side is dialed to start communication. The transmitting original 1B is read with predetermined timing, and the picture signal 12 therefrom is supplied to a mask circuit 14. According to memory data outputted by the mark position memory circuit 13, the mask circuit 14 masks the picture data which are located outside the marks 6 and converts them into "white" picture signals.

The picture signal 16 which has been obtained or extracted as described above is supplied to an encoding circuit 17, where it is encoded. The signal thus encoded is modulated by a modulating circuit 18 and is then transmitted through a line 119 to the facsimile device on the signal receiving side. The facsimile device on the signal receiving side carries out the ordinary signal receiving and recording operation, so that the picture data in the region E of the transmitting original 1B is reproduced.

Figure 7:
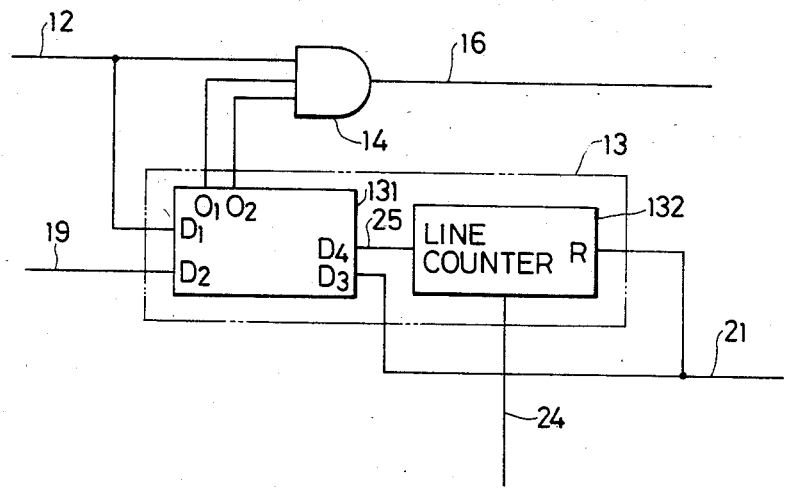
FIG. 7 is a block diagram showing examples of a mark position memory circuit and a mask circuit of the invention.
Figure 9:
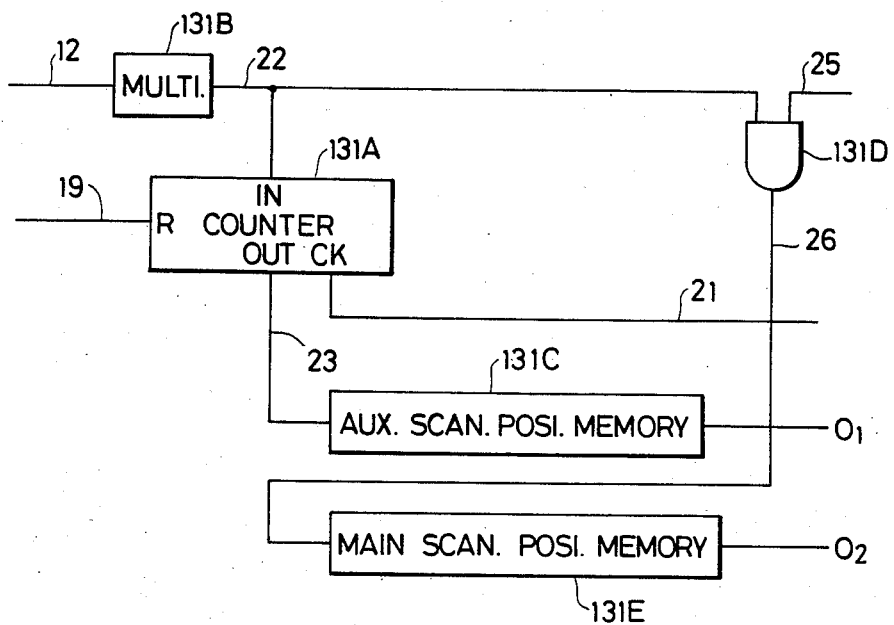
FIG. 9 is a block diagram showing an example of the control section of the invention.
Figure 10A:
FIGS. 10a–e show various waveforms for a description of the circuit operation during main scanning position determination.
Figure 10B:
Figure 10C:
Figure 10D:
Figure 10E:

FIG. 7 shows the mark position memory circuit and the mask circuit in greater detail. The binary-encoded picture signal 12 is applied to one input terminal of the mask circuit 14 comprising a 3-input AND circuit and to a first data input terminal $D_1$ of a control section 131 in the mask position memory circuit 13. Prior to this, a start pulse 19 (part (a) of FIG. 8) for starting the reading is applied to a second data input terminal $D_2$ of the control section 131. The control section 131 is more completely shown in FIG. 9. In FIG. 9, the start pulse 19 is supplied to the reset terminal R of an auxiliary scanning position counting counter 131A. A synchronizing signal 21 (part (b) of FIG. 8) for each scanning, which is applied to a third input terminal $D_3$ (FIG. 7), is supplied to the clock input terminal CK of the auxiliary scanning position counting counter 131A, so that scanning lines are counted.

On the other hand, the picture signal (part (c) of FIG. 8) which is supplied to the first input terminal $D_1$ of the control section 131 is applied to a bistable multivibrator 131B. With the synchronizing pulse 21 occurring at the time instant $t_1$, the reading of the specifying original 1A (FIG. 5) is initiated, and with the synchronizing pulse at the time instant $t_2$, the scanning of the front ends of the marks 6 is started. In this case during the period of time between time instants $t_2$ and $t_3$, when the rear ends of the marks 6 are scanned, the picture signal 12 is raised to a high level at two positions (or twice) for each scanning. The bistable multi-vibrator 131B forms a mark detection signal 22 (part (d) of FIG. 8) for each scanning line.

The mark detection signal 22 is applied to the input terminal IN of the auxiliary scanning positin counting counter 131A. Whenever the mark detection signal 22 is supplied to the counter 131A, the latter outputs its count value, as an auxiliary scanning position count value signal 23, through its output terminal OUT. This output signal 23 is written into an auxiliary scanning position memory element 131C. Thus, the positions, in the auxiliary scanning direction, of the marks 6 are stored as the scanning line numbers.

Now, the discrimination and storage of the distance, in the main scanning direction, between the marks 6 will be described. The synchronizing signal 21 (part (a) of FIG. 10) is further applied to the reset terminal R of a line counter 132. The line counter, being reset by the signal 21, repeatedly counts a video clock signal 24 (part (b) of FIG. 10) which is produced for every bit of the picture signal 12, thus producing a count value signal 25. The signal 25 is applied to a fourth input terminal $D_4$ of the control section 131. In the control section 131, the count value signal 25 and the mark detection signal (part (c) of FIG. 10) are applied to a 2-input AND circuit 131D, which outputs a main scanning position count value signal 26 (part (d) of FIG. 10). The signal 26 is stored in a main scanning position memory element 131E. Thus, the position in the main scanning direction which is defined by two marks 6 is stored as the bit number of picture elements (N to N+M).

The operation of reading the transmitting original 1B (FIG. 6) will now be described. Upon the initiation of the reading operation, the picture signal 12 is supplied to the mask circuit 14 (FIG. 7). The remaining two input terminals of the 3-input AND circuit forming the mask circuit 14 are connected to two output terminals O1 and O2 of the control section 131. The auxiliary scanning position memory element 131C (FIG. 9) supplies an auxiliary scanning extraction signal 27 (part (e) of FIG. 8) which is raised to a high level at an auxiliary scanning position specified by the marks, to the first output terminal O1. On the other hand, a main scanning position memory element 131E supplies a main scanning extraction signal 28 (the part (e) of FIG. 10) which is raised to a high level at a main scanning position specified by the marks 6. As a result, the mask circuit 14 outputs a picture signal which is provided by extracting only the picture data in the region E as shown in FIG. 6.

Figure 4A:
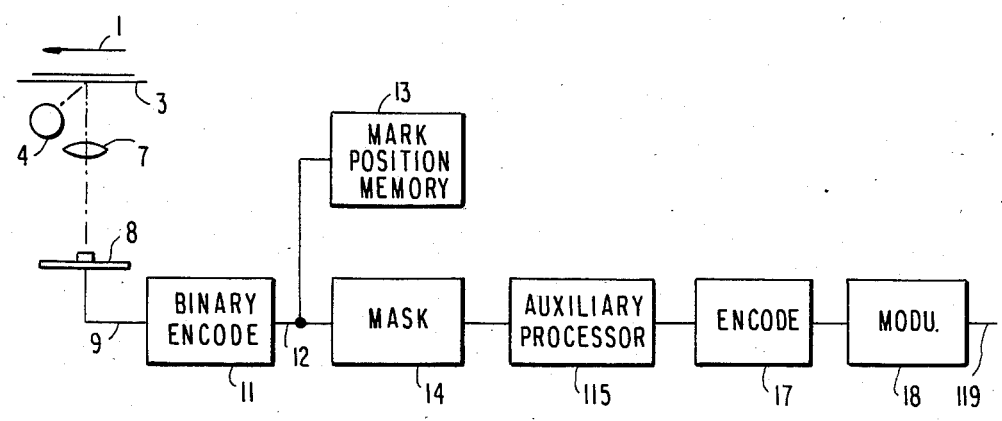
FIG. 4(a) is a block diagram showing a variation of the embodiment of FIG. 4.

Extraction of picture data has been described; however, rearrangement of picture data, enlarging or contracting of picture data such as characters, or changing of color data (coloring) can be carried out by modifying the above-described circuitry to provide an auxiliary processor 115, as shown in FIG. 4(a). Picture data can be rearranged by employing a method in which a page memory capable of storing picture signals of as much as one page of transmitting original is used, so that the picture signal of a specified region is stored in the altered region. Picture data such as characters can be enlarged or contracted by changing the period of the video clock pulse or increasing the number of scanning lines in transmitting the picture signal of a specified region. Enlargement or contraction in the auxiliary scanning direction can also be realized by changing the speed of movement, in the auxiliary scanning direction, of a recording sheet on the signal recording side. Finally, the alteration of color data can be realized by changing a signal representing the color data into a desired one during the outputting of the picture signal of a specified region.

In the above-described embodiment, the picture signal is processed with a rectangular region being specified. However, if the position data storing capacity is increased, the picture signal of a region having any given contour can be processed.

As is apparent from the above description, according to the invention, it is unnecessary to provide a copy of an original or to use a document carrier in order to specify a region of the original; that is, in the invention, the region can be specified with a sheet which is ordinarily used. Accordingly, the partial processing of the picture data can be readily achieved and carried out economically.

We claim:

1. In a picture data processing device of the type comprising a platen upon which document is disposed for irradiation from a light source to scan said document in a main scanning direction and an auxiliary scanning direction, said device having means for receiving light reflected from said platen and converting said reflected light into an electrical signal, the improvement comprising:

a mark position memory circuit for storing electrical signals generated by reading a mark specifying document, said mark specifying document indicating at least one portion of an original document to be processed; and processing means receiving electrical signals generated by reading said original document and memory data from said mark position memory circuit in synchronism, said processing means masking out all but said at least one portion of said original document.

2. The picture data processing device as recited in claim 1, wherein said mark specifying document comprises a sheet of paper with a plurality of markings thereon, said markings being disposed in said main and auxiliary scanning directions of said mark specifying document so as to physically define said at least one portion of said original document.

3. The picture data processing device as recited in claim 2, wherein said mark position memory circuit comprises:

a multivibrator for producing output pulses when said markings are detected on each scanning line of said mark specifying document;

a first counter for counting scanning lines;

a second counter for counting a series of clock pulses;

a first auxiliary memory means for storing the count of said first counter upon an occurrence of an output pulse from said multivibrator to store the position of said markings in said auxiliary scanning direction; and a second auxiliary memory means for storing the count of said second counter upon an occurrence of an output pulse from said multivibrator to store the position of said markings in said main scanning direction.

4. The picture data processing device of claim 3, wherein said processing means comprises a logic gate which receives said electrical signal generated by reading said original document, a first memory signal from said first auxiliary memory means, and a second memory signal from said second auxiliary memory means, said first and second memory signals being sent to said logic gate in synchronism with said electrical signals generated by reading said original document.

5. The picture processing device of claim 1, further comprising an auxiliary processing means for performing a signal processing operation with respect to said at least one portion of said original document.

6. A method of processing the picture data of an original document, comprising the steps of:

reading mask data from a mark specifying document, said mask data physically defining a given area or areas of said original document;

converting said mask data into an electrical mask signal;

storing said electrical mask signal;

reading said picture data of said original document;

converting said picture data into an electrical picture data signal;

reading out said stored electrical mask signal in synchronism with said electrical picture data signal;

comparing said electrical picture data signal to said electrical mask signal; and outputting a portion or portions of said electrical picture data corresponding to said given area or areas of said original document.

* * * * *